US012674918B2

(12) United States Patent
Jamali et al.

(10) Patent No.: US 12,674,918 B2
(45) Date of Patent: Jul. 7, 2026

(54) DISPLAY FOR AUGMENTED REALITY AND VIRTUAL REALITY SYSTEMS

(71) Applicant: KENT STATE UNIVERSITY, Kent, OH (US)

(72) Inventors: Afsoon Jamali, Menlo Park, CA (US); Amit Bhowmick, Kent, OH (US); Douglas Bryant, Kent, OH (US); Sandro Pintz, Menlo Park, CA (US); Phillip Bos, Hudson, OH (US)

(73) Assignee: KENT STATE UNIVERSITY, Kent, OH (US)

( * ) Notice: Subject to any disclaimer, the term of this patent is extended or adjusted under 35 U.S.C. 154(b) by 377 days.

(21) Appl. No.: 18/214,057

(22) Filed: Jun. 26, 2023

(65) Prior Publication Data

US 2024/0004107 A1 Jan. 4, 2024

Related U.S. Application Data

(60) Provisional application No. 63/357,224, filed on Jun. 30, 2022.

(51) Int. Cl.
| | |
|---|---|
| *G02B 3/00* | (2006.01) |
| *G02B 3/14* | (2006.01) |
| *G02B 27/01* | (2006.01) |
| *G02F 1/29* | (2006.01) |

(52) U.S. Cl.
CPC ............. *G02B 3/0087* (2013.01); *G02B 3/14* (2013.01); *G02B 27/0172* (2013.01); *G02F 1/294* (2021.01); *G02B 2003/0093* (2013.01)

(58) Field of Classification Search
CPC .................................................... G02B 3/0087
See application file for complete search history.

(56) References Cited

U.S. PATENT DOCUMENTS

| | | | |
|---|---|---|---|
| 9,280,020 B2 | 3/2016 | Bos et al. |
| 9,323,113 B2 | 4/2016 | Bos et al. |
| 9,470,934 B2 | 10/2016 | Liwei et al. |

(Continued)

OTHER PUBLICATIONS

Liwei, Li, et al., "Liquid Crystal lens with concentric electrodes and inter-electrode resistors" Liquid Crystals Reviews http://www. tandfonline.com/loi/tlcr20 Downloaded Feb. 11, 2015.

*Primary Examiner* — Edmond C Lau
(74) *Attorney, Agent, or Firm* — Lippes Mathias LLP

(57) ABSTRACT

A gradient refractive index (GRIN) lens includes a transparent central disk and transparent annular segments, including central annular segments and peripheral annular segments. The central disk and each annular segment has a continuous optical phase profile at a design wavelength along a radial direction extending outward from a center of the central disk. An optical phase discontinuity is present at the interface between the central disk and the innermost central annular segment and at the interface between each pair of adjacent annular segments. Radial widths of the central annular segments decrease with increasing distance away from the center of the central disk. The peripheral annular segments have optical phase profiles for the design wavelength that are linear or have maximum first derivatives that are constant or become smaller with increasing distance of the peripheral annular segments away from the center of the central disk.

21 Claims, 6 Drawing Sheets

(56)         References Cited

U.S. PATENT DOCUMENTS

| | | | |
|---|---|---|---|
| 2019/0086761 A1* | 3/2019 | Galstian | .................... G02F 1/29 |
| 2021/0109400 A1* | 4/2021 | Kim | .................. G02F 1/133514 |
| 2021/0271000 A1* | 9/2021 | Park | .................... G02B 5/1871 |
| 2022/0057691 A1* | 2/2022 | Piskunov | ................ G06F 3/013 |

* cited by examiner

(A)

(B)

(A) Calculated MTF for parabolic shape phase profile

(B) Calculated MTF for hybrid shape phase profile

(A)

(B)

DISPLAY FOR AUGMENTED REALITY AND VIRTUAL REALITY SYSTEMS

This application claims the benefit of U.S. Provisional Application No. 63/357,224 filed Jun. 30, 2022 and titled "DISPLAY FOR AUGMENTED REALITY AND VIRTUAL REALITY SYSTEMS". U.S. Provisional Application No. 63/357,224 filed Jun. 30, 2022 and titled "DISPLAY FOR AUGMENTED REALITY AND VIRTUAL REALITY SYSTEMS" is hereby incorporated by reference in its entirety into the specification of this application.

BACKGROUND

The following relates to the optical arts, refractive optical component arts, gradient refractive index (GRIN) lens arts, augmented reality (AR) arts, virtual reality (VR) arts, and related arts.

A gradient refractive index (GRIN) lens employs a refractive index gradient to implement an optical phase profile at a design wavelength. (Without loss of generality, the design wavelength of a GRIN lens is represented herein as design wavelength $\lambda$. A GRIN lens can provide a low-profile lens with flat surfaces (that is, the GRIN lens can be shaped as a disk), and lensing performance that avoids lens aberrations that may occur with a lens made of a material with a single refractive index, such as a conventional convex, concave, or concave/convex lens made of single-constituent glass, quartz, or other optically transparent material.

A GRIN lens made using a liquid crystal (LC) material can provide these benefits with the additional benefit of having an electrically tunable focal length. This enables construction of a high quality, low cost, light-weight, low voltage, electrically adjustable lens for use in diverse applications such as adjustable reading glasses and accommodation lenses and/or other lenses of an augmented reality (AR) or virtual reality (VR) headset. Some examples of GRIN lenses implemented using LC material are described for example in Liwei Li, Doug Bryant, and Philip J. Bos, "Liquid crystal lens with concentric electrodes and inter-electrode resistors", *Liquid Crystal Reviews* vol. 2 no. 2, pages 130-154 (2014) (hereinafter "Li et al.") which is incorporated herein by reference in its entirety.

However, LC GRIN lenses have certain limitations. For example, the thickness of a lens with a continuous parabolic phase profile is given by:

$$d = \frac{D * R^2}{2 * \Delta n} \tag{1}$$

where R is the radius of the lens in meters, D is the optical power of the lens in Diopters, and $\Delta n$ is the birefringence of the liquid crystal material. This limitation can impose an undesirably large thickness on a disk-shaped GRIN lens of large diameter. Another limitation is that the switching time of a liquid crystal device is proportional to the square of the thickness, i.e. is proportional to $d^2$. For many variable power lensing applications in areas such as AR or VR, the switching speed of the device should be less that about 1 second, which places a limit on the radius of the lens for a given value of the optical power D.

With reference to FIG. 6 parts (A) and (B), some of these limitations can be partially alleviated by utilizing a GRIN lens with a segmented phase profile. FIG. 6 part (A) shows a GRIN lens for a design wavelength of $\lambda$=543.5 nm with a diameter of 20 mm and a desired ideal parabolic phase profile along a radial direction extending radially outward from a center of the GRIN lens. The optical phase profile has a maximum value of the product $$\frac{\Delta n \cdot d}{\lambda}$$

of 35 wavelengths. FIG. 6 part (B) shows an implementation of the GRIN lens of part (A), again for a design wavelength of $\lambda$=543.5 nm, but using a segmented phase profile in which the maximum value of the product $$\frac{\Delta n \cdot d}{\lambda}$$

is 7, thereby reducing the thickness of the GRIN lens by a factor of 5, and increasing the speed by a factor of 25. The segmented phase GRIN lens of FIG. 6 part (B) is again shaped as a disk, but here the disk is divided into a central disk and a plurality of annular segments. The central disk corresponds to the continuous parabolic optical phase profile along the radial direction at the center of the segmented GRIN lens, which in FIG. 6 part (B) is in the range of about 6-14 mm. Each annular segment disposed around the central disk also has a continuous parabolic optical phase profile along the radial direction. However, in the segmented GRIN lens of FIG. 6 part (B), an optical phase discontinuity is present at the interface between the central disk and the innermost annular segment and at the interface between each pair of adjacent annular segments. Specifically in the example of FIG. 6 part (B) the optical phase discontinuity at each such interface is of magnitude 7$\lambda$.

In a suitable approach for designing a segmented GRIN lens, the thickness $d_{seg}$ of the segmented GRIN lens is constrained by the constraint: $d_{seg} \leq d_{max}$, where $d_{max}$ is the maximum thickness value that is acceptable in terms of physical lens thickness and the desired response time (e.g. a 1 second response time previously mentioned for some AR or VR systems). With the thickness of the segmented GRIN lens constrained to $d_{seg} \leq d_{max}$, along with knowledge of $\Delta n$ of the LC material of the GRIN lens, the segmentation of the optical phase profile can be chosen so that $N\lambda$ fits within the design-basis maximum lens thickness $d_{max}$. Specifically, the parabolic phase profile (e.g. such as that of FIG. 6 part (A)) is segmented into $$\frac{d}{d_{max}}$$

segments, where d is the thickness of the corresponding non-segmented GRIN lens (e.g. 35 wavelengths in the example of FIG. 6 part (A), more generally given by Equation (1)), and $d_{max}$ is the constraint on the actual thickness of the segmented GRIN lens.

BRIEF SUMMARY

In some nonlimiting illustrative embodiments, a refractive optical device includes a gradient refractive index (GRIN) lens shaped as a disk. The GRIN lens includes a central disk and a plurality of annular segments. The plurality of annular segments includes: a plurality of central annular segments disposed around the central disk; and a plurality of peripheral annular segments disposed around the plurality of central annular segments. The central disk and each annular segment is transparent at a design wavelength. The central disk and each annular segment has a continuous optical phase profile at the design wavelength along a radial direction extending radially outward from a center of the central disk. An optical phase discontinuity is present at the interface between the central disk and the innermost central annular segment and at the interface between each pair of adjacent annular segments. Radial widths of the central annular segments decrease with increasing distance away from the center of the central disk. The peripheral annular segments have optical phase profiles for the design wavelength with maximum first derivatives that are constant or become smaller with increasing distance of the peripheral annular segments away from the center of the central disk.

In some nonlimiting illustrative embodiments, a refractive optical device includes a GRIN lens shaped as a disk having a radius of at least 2.5 cm. The GRIN lens includes a central disk and a plurality of annular segments. The plurality of annular segments includes: a plurality of central annular segments disposed around the central disk; and a plurality of peripheral annular segments disposed around the plurality of central annular segments. The central disk and each annular segment is transparent at a design wavelength. The central disk and each annular segment has a continuous optical phase profile at the design wavelength along a radial direction extending radially outward from a center of the central disk. An optical phase discontinuity is present at the interface between the central disk and the innermost central annular segment and at the interface between each pair of adjacent annular segments. Radial widths of the central annular segments decrease with increasing distance away from the center of the central disk. The peripheral annular segments have widths of at least 0.8 mm.

In some nonlimiting illustrative embodiments, a refractive optical device includes a GRIN lens shaped as a disk. The GRIN lens includes a central disk and a plurality of annular segments disposed around the central disk. Light blocking material is disposed over the interface between the central disk and the central annular segment adjacent the central segment and over the interface between each pair of adjacent annular segments. The light absorbing material is effective to block light at a design wavelength. The central disk and each annular segment is transparent at the design wavelength. The central disk and each annular segment has a continuous optical phase profile at the design wavelength along a radial direction extending radially outward from a center of the central disk. An optical phase discontinuity is present at the interface between the central disk and the innermost central annular segment and at the interface between each pair of adjacent annular segments

DETAILED DESCRIPTION

Figure 6:
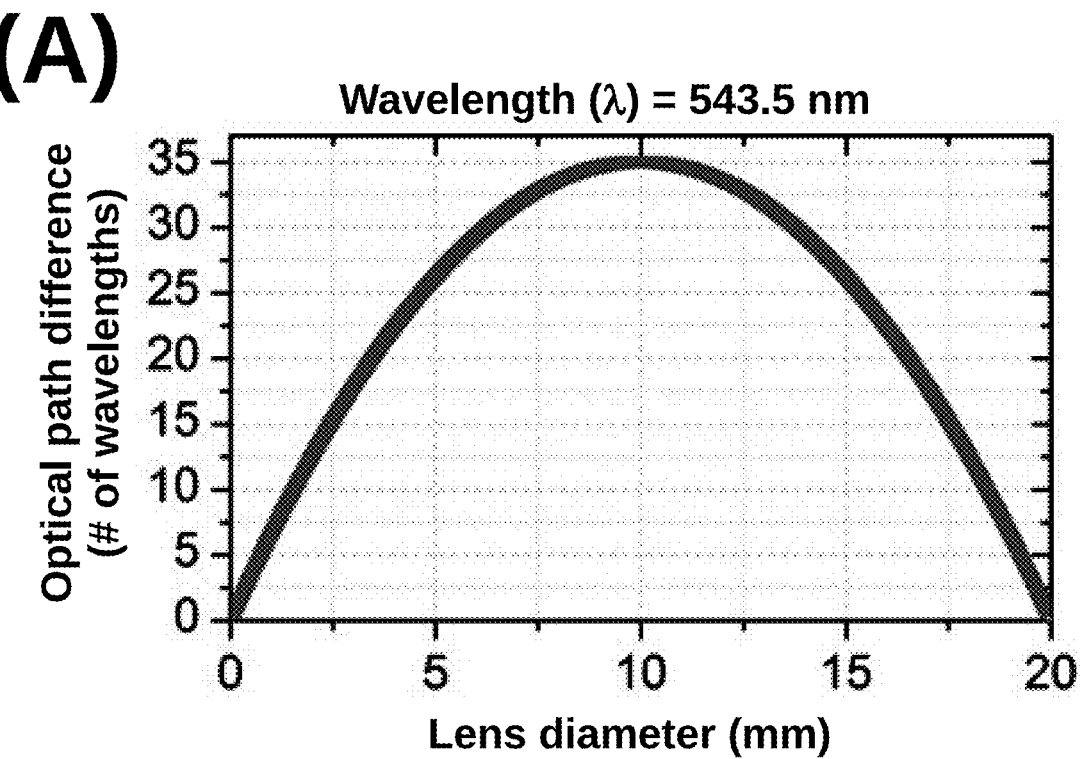
FIG. 6 diagrammatically shows: (A) a phase profile for a parabolic GRIN lens; and (B) a phase profile for a segmented parabolic GRIN lens.
Figure 6:
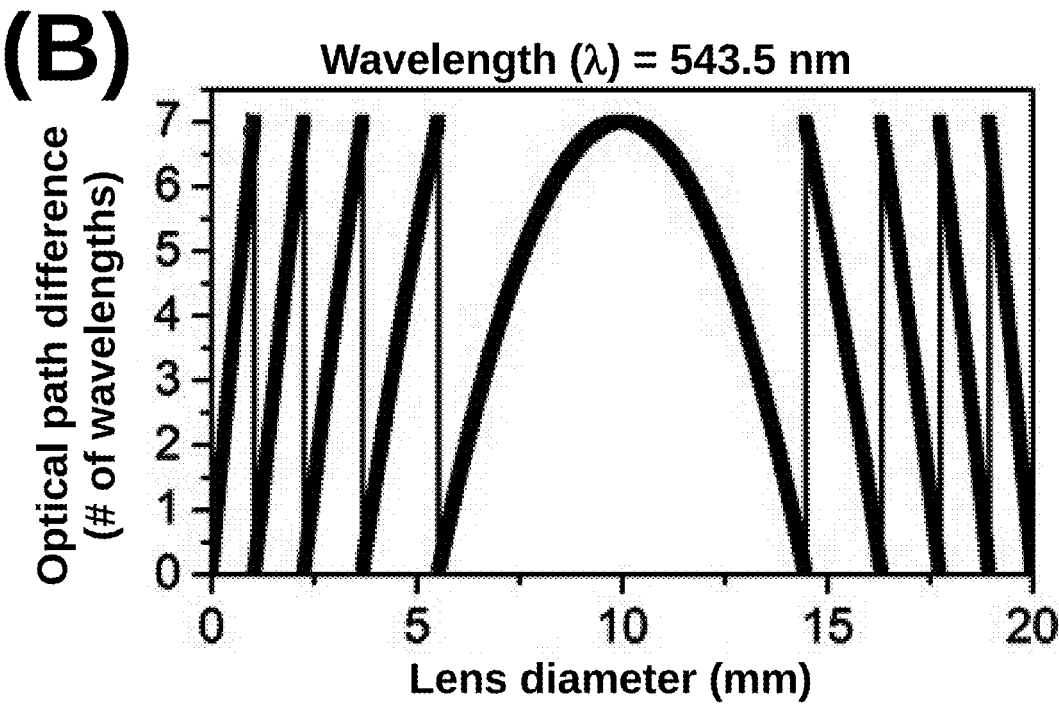

With continuing reference to FIG. 6 parts (A) and (B), due to the rapidly increasing slope or derivative of the desired parabolic optical phase profile at the design wavelength $\lambda$ as the radial distance from the center of the lens increases, the width of the annular segments becomes smaller and smaller as the radius increases. As recognized herein, an issue with this approach is that there can be noticeable image degradation due to diffraction and light scattering if the width of the segments becomes too small. For example, as the radial widths of the outermost annular segments of the segmented GRIN lens become less than about 1 mm, this image degradation can become disturbingly noticeable. Consequently, the use of a segmented GRIN lens becomes problematic for larger lens radius values.

Based on the restriction on keeping the outermost annular segment radial widths greater than about 1 mm and in consideration of Equation (1), it can be shown that segmented GRIN lens is a good solution to the speed issue for a 2 Diopter variable power lens only if the diameter of the lens is less than about 1 inch (2.5 cm). A 1-inch diameter lens is generally suitable since the natural tendency is to look in or near to the straight-ahead direction, since the eye has greatest acuity for straight-ahead viewing and visual acuity degrades rapidly for larger viewing angles. However, a segmented GRIN lens of 1-inch diameter or less can create optical disturbances if the user of the segmented GRIN lens glances at a large angle, as the user will then be looking not though the center of the lens, but at a large radius value of the lens. If the maximum radius of the lens is too small (e.g., around 1-inch or less) for the considered gaze angle, the user will be looking over the edge of the lens. Brief large-angle glances can occur relatively frequently in applications such as VR gaming in which the user may be attempting to detect gaming opponents or other activity, events, objects, or the like in a VR setting. When looking over the edge of a lens there is a noticeable change in the size and position of a viewed object (or the viewed image of the virtual object in a VR or AR setting). This type of visual disturbance can be distracting, and can lead to suboptimal VR gaming performance by players who are interrupted by such disturbances. Moreover, as the VR or AR environment may have other visual issues due to factors such as accommodation and convergence effects known in the VR and AR fields, the additional impact of visual disturbance due to glances "over the edge" of the segmented GRIN lens can be especially problematic and potentially disorienting in VR or AR.

In segmented GRIN lenses disclosed herein, this problem is addressed by an approach referred to herein as a hybrid phase profile, in which a modified optical phase profile along the radial direction is employed that breaks away from the parabolic (or other optically focusing) profile for peripheral annular segments of the segmented GRIN lens. This break from parabolicity (or other optically focusing profile) to an optical phase profile along the radial direction that is more linear for the peripheral annular segments enables those annular segments to have radial widths that are sufficiently large (e.g. around 0.8 mm or larger in some embodiments) to reduce or eliminate image degradation due to diffraction and light scattering by the peripheral annular segments. Notably, this modification means that the peripheral annular segments are not properly focusing the light, and this might be expected to produce optical disturbances. That is, changing the phase profile from the usual segmented parabolic phase profile to one with more linearized phase profiles for the peripheral annular segments will necessarily degrade the ideal focusing ability of the segmented GRIN lens.

However, it was observed that users found segmented GRIN lenses with hybrid phase profiles as disclosed herein to be surprisingly less distracting to the user, as compared with equivalent segmented GRIN lenses that employed the parabolic optical phase profile in the radial direction for all segments including the peripheral optical segments. Without being limited to any particular theory of operation, it is believed this perceived improvement attained by the disclosed hybrid optical phase profile is due to the user having significantly degraded optical acuity at large viewing angles simply due to the biological optics of the eye, so that the loss of ideal focusing for the modified peripheral annular segments with more linearized optical phase profiles is not particularly noticeable to the user. Put another way, the user is not expecting sharp focus at large viewing angles, so the focusing degradation at large viewing angles produced by the hybrid optical phase profile is not perceptually disturbing. By contrast, the user is not expecting to see light diffraction or light scattering at large viewing angles, and so this effect produced by the very small widths of the peripheral annular segments of a segmented GRIN lens with a conventional fully parabolic optical phase profile a is highly noticeable and disturbing to the user.

Figure 1:
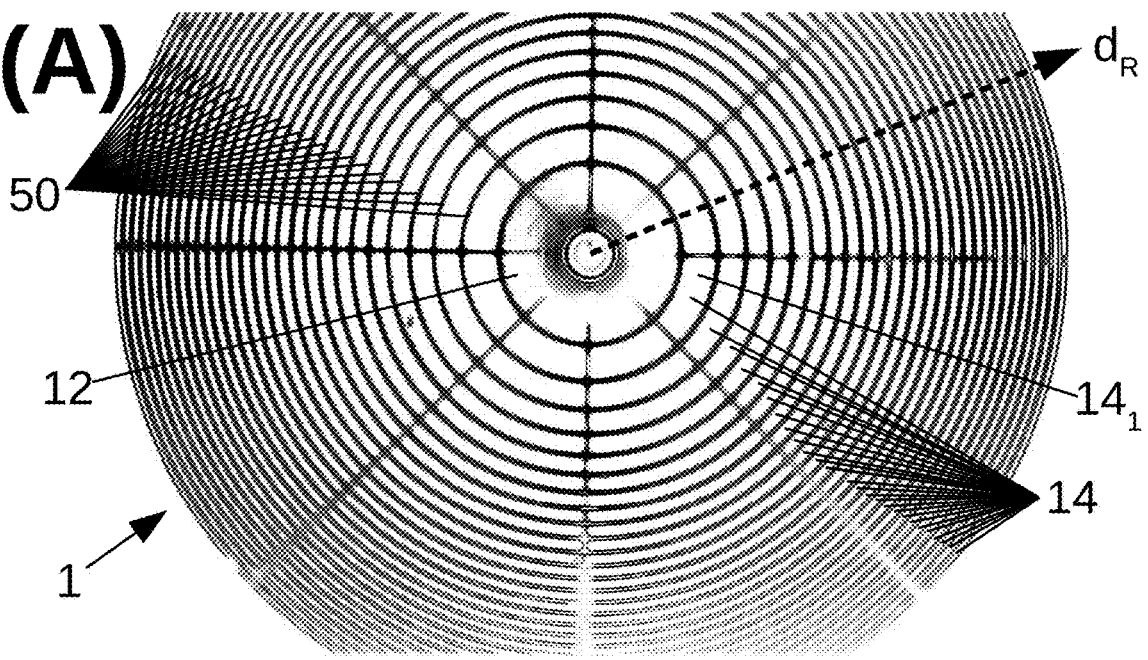
FIG. 1 diagrammatically shows: (A) a plan view of a gradient refractive index (GRIN) lens; and (B) a plan view of a GRIN lens modified as disclosed herein to improve peripheral vision performance.
Figure 1:
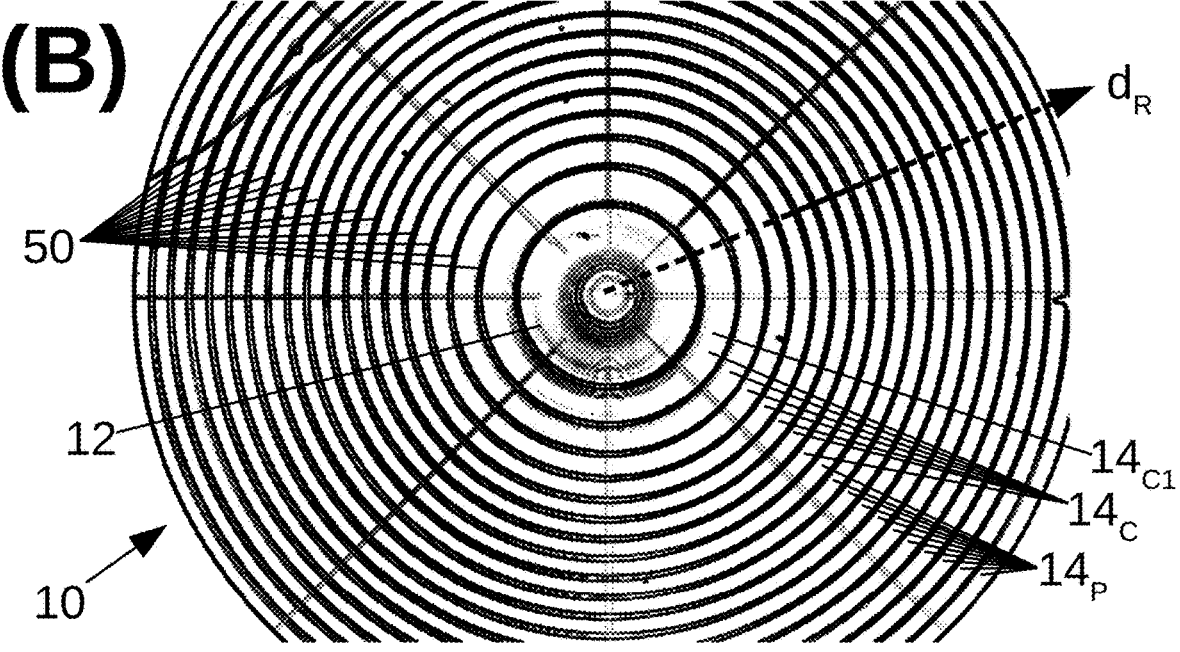

With reference to FIG. 1 parts (A) and (B), the hybrid optical phase profile disclosed herein is illustrated. FIG. 1 part (A) shows a portion of a segmented GRIN lens 1 with a 5 cm diameter having an optical phase profile for the design wavelength that is parabolic for all annular segments. More particularly, the GRIN lens 1 has a central disk 12 and a plurality of annular segments 14 disposed around the central disk 12. The central disk 12 and each annular segment 14 is transparent at the design wavelength $\lambda$. The central disk 12 and each annular segment 14 has a continuous optical phase profile at the design wavelength along a radial direction $d_R$ extending radially outward from the center of the central disk 12. (Note that FIG. 1 parts (A) and (B) show the radial direction $d_R$ along a single representative angle $\varphi$ of a polar coordinate system centered on the center of the central disk 12; however, the illustrative GRIN lenses are rotationally symmetric so that the radial direction $d_R$ can be considered to be along any chosen angle $\varphi$.) An optical phase discontinuity is present at the (annular) interface between the central disk 12 and the innermost central annular segment $14_1$ and at the (annular) interface between each pair of adjacent annular segments 14. The radial widths along the radial direction $d_R$ of the annular segments 14 decrease with increasing distance away from the center of the central disk 12 along the radial direction $d_R$. This is a consequence of the parabolic optical phase profile being implemented by all annular segments 14 of the GRIN lens 1. More generally, the segmented GRIN lens 1 has a (segmented) focusing optical phase profile with a first derivative whose magnitude monotonically increases with increasing distance away from the center of the lens—a consequence of this monotonically increasing first derivative is that the radial width of each annular segment 14 at which the optical path difference $N\lambda$ is reached decreases with increasing distance away from the center of the lens. As seen in FIG. 1 part (A), this results in the outermost annular segments having a very narrow radial width, which as previously discussed leads to noticeable image degradation at large glancing angles due to diffraction and light scattering as the widths of the outermost annular segments become very small. The problem is especially acute as the lens diameter increases, such as in the illustrative lens with a lens diameter of 5 cm (~2 inches).

FIG. 1 part (B) shows a portion of a segmented GRIN lens 10 with a 5 cm diameter having an optical phase profile for the design wavelength that is parabolic for a plurality of central annular segments $14_C$, but is not parabolic (and in some embodiments is linear, or closer to linear than to parabolic) for a plurality of peripheral annular segments $14_P$. More particularly, the GRIN lens 10 of FIG. 1 part (B) has a central disk 12 and a plurality of annular segments $14_C$ and $14_P$ disposed around the central disk 10. The plurality of annular segments $14_C$ and $14_P$ include: a plurality of central annular segments $14_C$ disposed around the central disk 12; and a plurality of peripheral annular segments $14_P$ disposed around the plurality of central annular segments $14_C$. The central disk 12 and each annular segment $14_C$, $14_P$ is transparent at the design wavelength $\lambda$. The central disk 12 and each annular segment $14_C$, $14_P$ has a continuous optical phase profile at the design wavelength along the radial direction $d_R$ extending radially outward from the center of the central disk 12. An optical phase discontinuity is present at the interface between the central disk 12 and the innermost central annular segment $14_{C1}$ and at the interface between each pair of adjacent annular segments (i.e., between each pair of adjacent annular segments $14_C$, between each pair of adjacent annular segments $14_P$, and between the outermost central annular segment $14_C$ and the adjacent innermost peripheral annular segment $14_P$). As already described for the segmented GRIN lens 1 of FIG. 1 part (A), the radial widths along the radial direction $d_R$ of the central annular segments $14_C$ of the segmented GRIN lens 10 of FIG. 1 part (B) decrease with increasing distance away from the center of the central disk 12 along the radial direction $d_R$. This is a consequence of the parabolic optical phase profile being implemented by the central annular segments $14_C$ of the GRIN lens 10. More generally, the central disk 12 and central annular segments $14_C$ the segmented GRIN lens 10 has a (segmented) focusing optical phase profile with a first derivative whose magnitude monotonically increases with increasing distance away from the center of the lens—a consequence of this monotonically increasing first derivative is that the radial width of each central annular segment $14_C$ at which the optical path difference $N\lambda$ is reached decreases with increasing distance away from the center of the lens.

However, the segmented GRIN lens 10 of FIG. 1 part (B) differs from the segmented GRIN lens 1 of FIG. 1 part (A) in that the segmented GRIN lens 10 of FIG. 1 part (B) employs a hybrid phase profile, in which the peripheral annular segments $14_P$ deviate from the parabolic optical phase profile (or more generally, deviates from the focusing optical phase profile with a first derivative whose magnitude monotonically increases with increasing distance away from the center of the lens) to a more linear profile.

Figure 2:
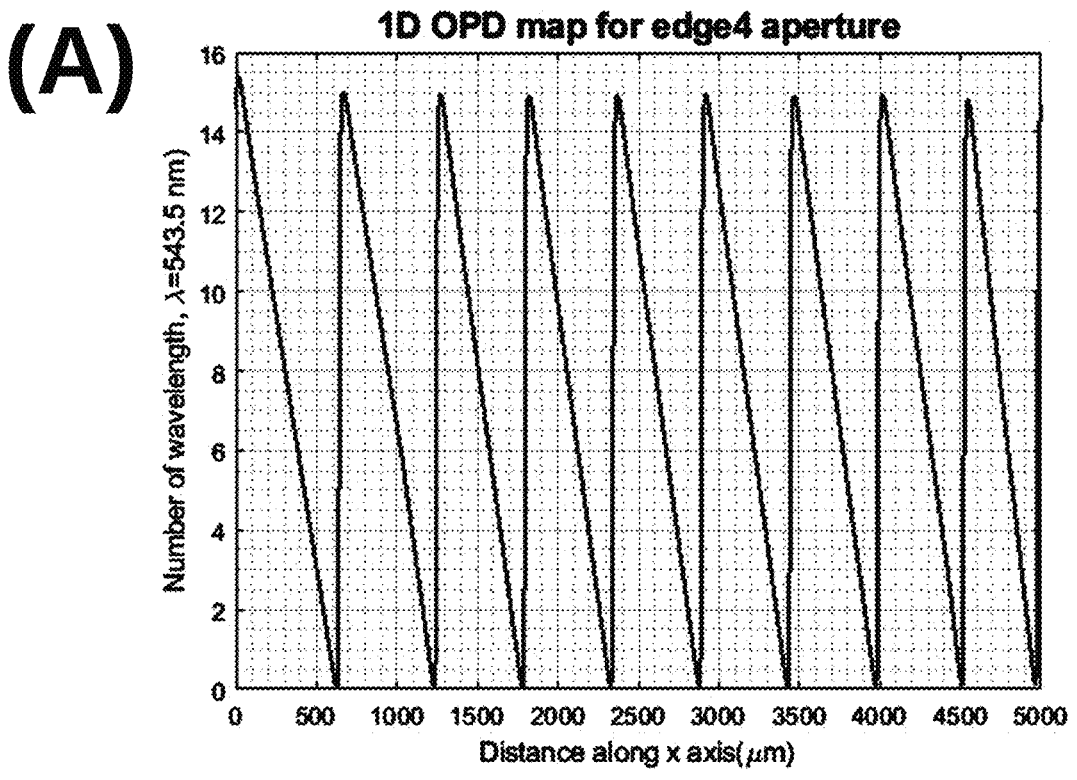
FIG. 2 diagrammatically shows: (A) a segmented phase profile of a peripheral portion of the GRIN lens of FIG. 1 part (A); and (B) a segmented phase profile of a peripheral portion of the GRIN lens of FIG. 1 part (B).
Figure 2:
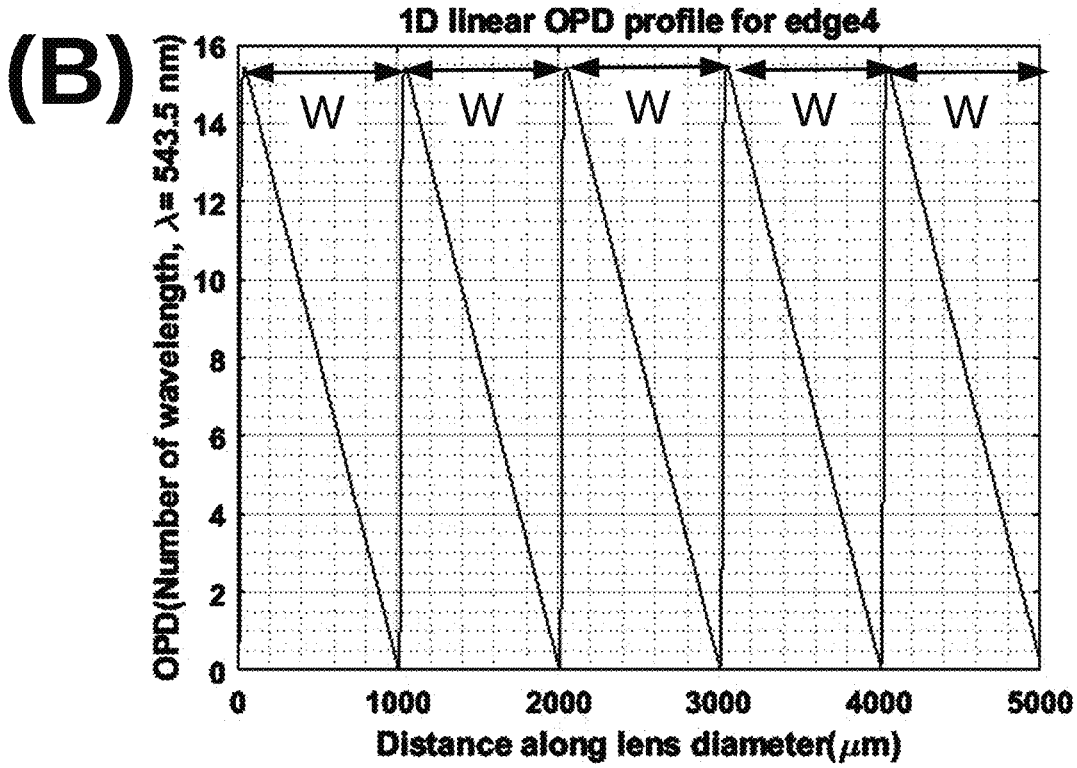

With continuing reference to FIG. 1 parts (A) and (B) and with further reference to FIG. 2 parts (A) and (B), in some embodiments, each peripheral annular segment $14_P$ has a linear optical phase profile. This is illustrated in FIG. 2 parts (A) and (B). FIG. 2 part (A) shows the optical phase profile of the segmented GRIN lens 1 of FIG. 1 part (A) for the outermost nine annular segments, corresponding to the outermost annulus of radial width 5000 microns (5 mm) for the lens of 2.5 cm radius. FIG. 2 part (B) shows the optical phase profile of the segmented GRIN lens 10 of FIG. 1 part (B) for the outermost five annular segments, which also corresponds to the outermost annulus of radial width 5000 microns (5 mm) for the lens of 2.5 cm radius. Each optical phase discontinuity between adjacent annular segments appears in FIG. 2 parts (A) and (B) as a vertical line, and in these examples the optical phase discontinuity is of magnitude about 15λ.

With particular reference to the hybrid optical phase profile of the segmented GRIN lens 10 of FIG. 1 part (B), as seen in FIG. 2 part (B) the optical phase profile for each of the seven peripheral annular segments $14_P$ is linear. Advantageously, for a linear optical phase profile the magnitude of the first derivative is constant and does not change with increasing distance away from the center of the lens. As a result, the radial width of each peripheral annular segment $14_P$ at which the optical path difference Nλ is reached is the same for every peripheral annular segment $14_P$. As seen in FIG. 1 part (B), this results in the peripheral annular segments $14_P$ all having the same fixed width. In FIG. 2 part (B), this fixed width of the peripheral annular segments $14_P$ is labeled as width W. The transition point from the central annular segments $14_C$ with successively narrowing radial widths to the peripheral annular segment $14_P$ of constant radial width is suitably chosen so that the width W of the peripheral annular segments $14_P$ is 0.8 mm or larger. In the illustrative embodiment of FIG. 1 part (B) and FIG. 2 part (B), the transition point from the central annular segments $14_C$ to the peripheral annular segment $14_P$ is chosen so that the width W of each peripheral annular segment $14_P$ is equal to 1 mm. In general, it has been found that if the outermost annular segments are less than about 1 mm (as in the case of FIG. 1 part (A) for the segmented GRIN lens of FIG. 1 part (A)), then this leads to noticeable image degradation at large glancing angles due to diffraction and light scattering.

To summarize, the hybrid optical phase profile of the embodiment of FIG. 1 part (A) avoids the noticeable image degradation at large glancing angles due to diffraction and light scattering by fixing the widths of the outermost (i.e. peripheral) annular segments $14_P$. In some embodiments, the GRIN lens 10 of FIG. 1 part (B) is shaped as a disk and has a radius of at least 2.5 cm, and the peripheral annular segments have widths of at least 0.8 mm.

Figure 3:
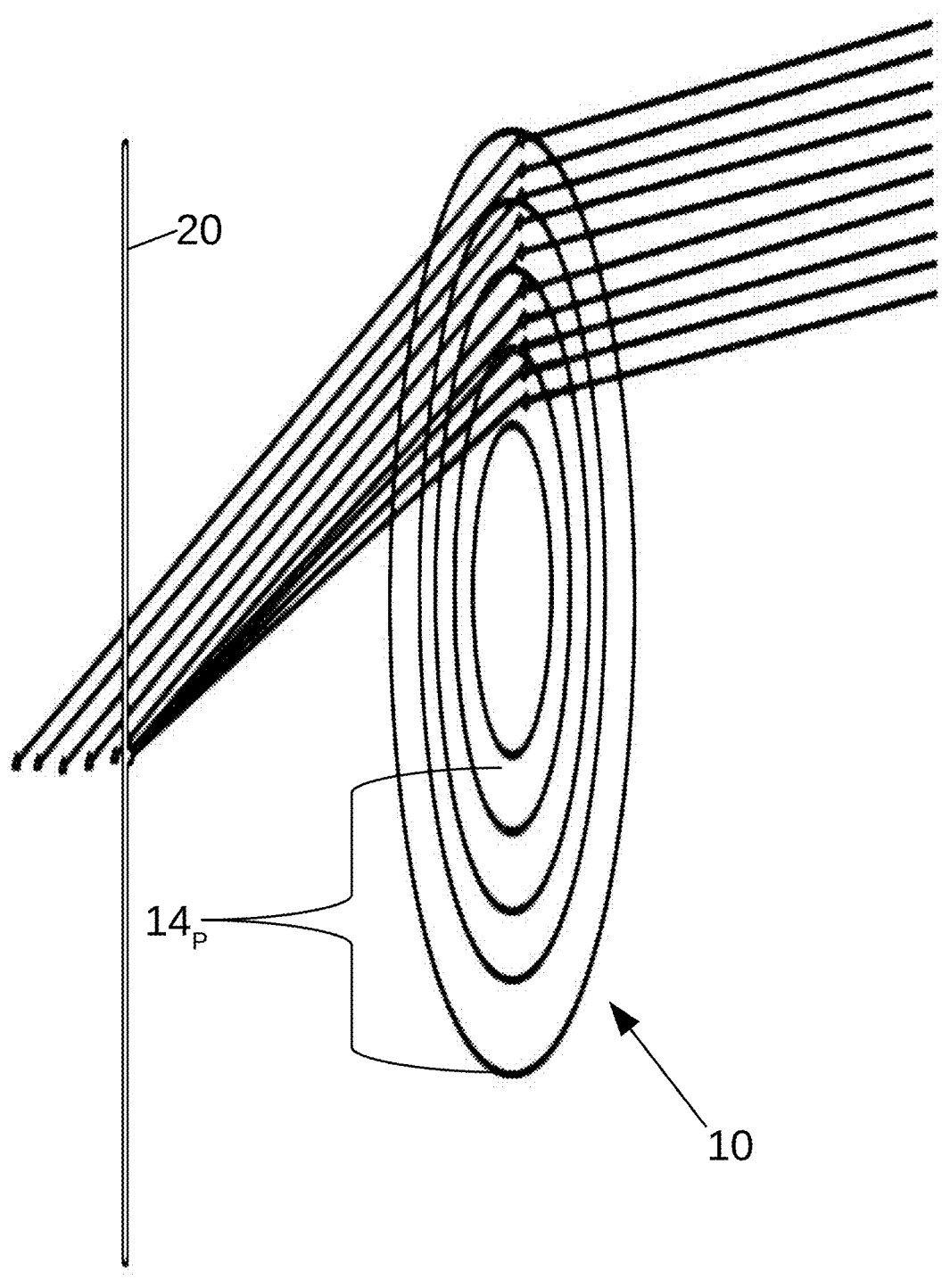
FIG. 3 diagrammatically shows focusing performance of the peripheral portion of the GRIN lens of FIG. 1 part (B) and FIG. 2 part (B).

With reference to FIG. 3, this fixed width W of the peripheral annular segments is obtained at the cost of degraded focusing acuity. The linear optical phase profiles of the peripheral annular segments $14_P$ do not achieve correct focus, as diagrammatically shown in FIG. 3, where the linear optical phase profiles lead to the light rays being focused at a plane that is increasingly further away from the design-basis focal plane 20 of the focusing (e.g. parabolic) optical phase profile. It is not apparent that this is good approach, since the annular segments $14_P$. are not providing proper focus of light of the design wavelength λ. However, it has been found that this degradation of the ideal focusing ability is more than offset by the increase in image quality due to a lowering of the diffraction and light scattering problems caused by having small width segments for the outermost annular segments, as in the case of the segmented GRIN lens 1 of FIG. 1 part (A) and as also seen in the optical phase profile of FIG. 2 part (A). The disclosed hybrid segmented phase profile GRIN lens 10 is advantageous, for example in applications where a change in focus power is needed. The problem solved is related to the loss in image quality observed when the user shifts their gaze to a large angle, and are therefore not looking through the center of the GRIN lens, but instead at a large radius value. The hybrid optical phase profile disclosed herein changes the phase profile of the lens in the peripheral annulus to be linear (or at least more linear), rather than parabolic.

In the illustrative hybrid optical phase profile as best seen in FIG. 2 part (B), the peripheral annular segments $14_P$ have linear optical phase profiles, which as discussed leads to the peripheral annular segments $14_P$ all having equal fixed width W. In other embodiments, the peripheral annular segments $14_P$ may have nonlinear optical phase profiles, but which are more linear than the parabolic or other focusing optical phase profile of the central disk 12 and central annular segments $14_C$. In general, the peripheral annular segments $14_P$ have optical phase profiles for the design wavelength λ with maximum first derivatives that are constant or become smaller with increasing distance of the peripheral annular segments away from the center of the central disk. In the illustrative case of linear optical phase profiles for the peripheral annular segments $14_P$ (e.g., FIG. 2 part (B)), the maximum first derivatives are constant for all peripheral annular segments $14_P$, as the maximum first derivative of each peripheral annular segment $14_P$ is equal to the slope of the linear optical phase profile.

Figure 4:
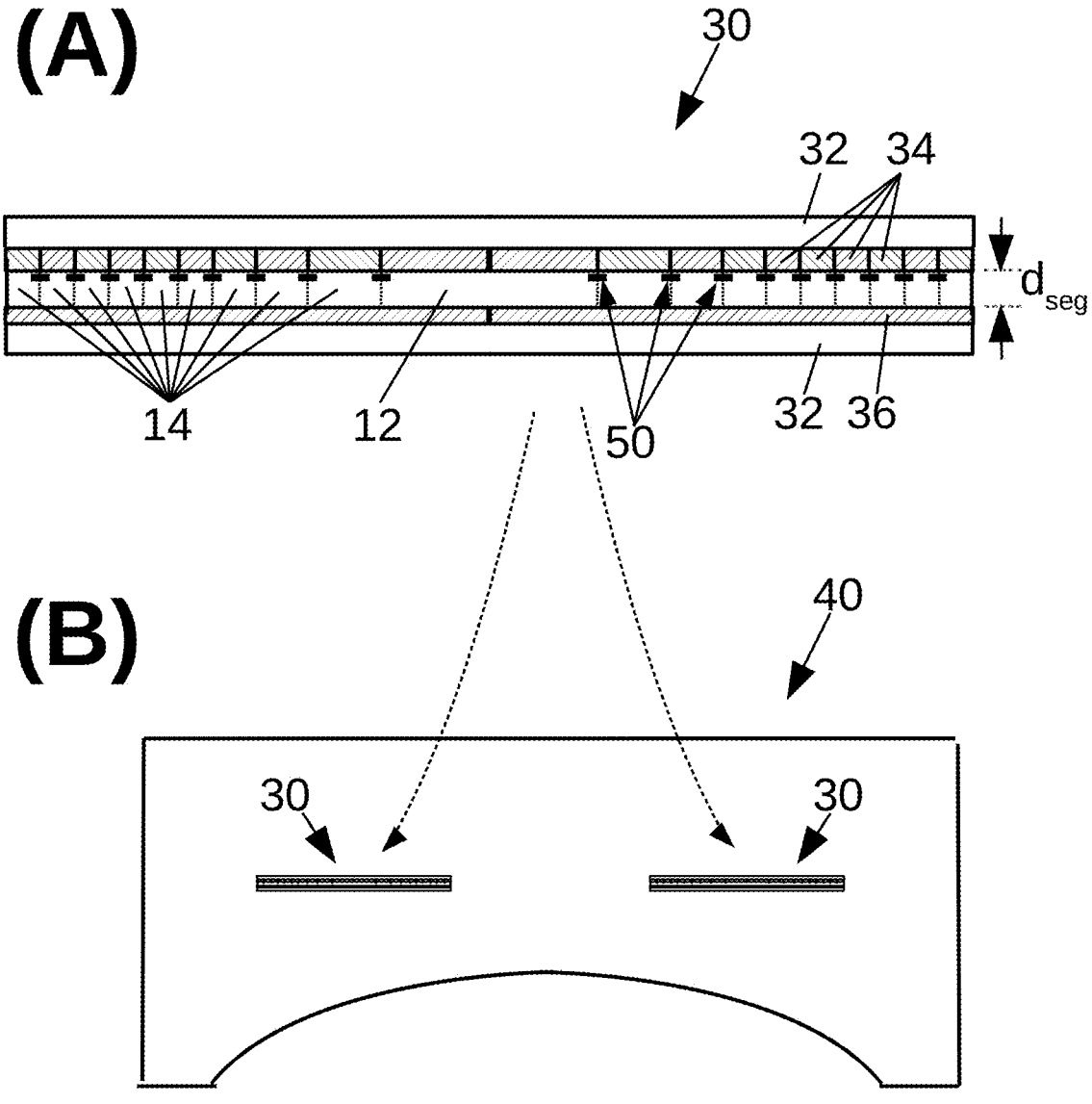
FIG. 4 diagrammatically shows: (A) a side sectional view of a liquid crystal (LC) lens implementation of the GRIN lens of FIG. 1 part (A); and (B) an augmented reality (AR) or virtual reality (VR) headset with left and right lenses comprising the GRIN lens of FIG. 4 part (A).

With reference to FIG. 4 part (A), an illustrative refractive optical device 30 is shown, in which the segmented GRIN lens 10 of FIG. 1 part (B) and FIG. 2 part (B) is implemented using a liquid crystal (LC) material. That is, the central disk 12 and each annular segment 14 (which include the central segments $14_C$ and peripheral segments $14_P$ shown in FIG. 1 part (A)) comprise a liquid crystal material. The refractive optical device 30 further includes a pair of substrates 32 confining the central disk 12 and the plurality of annular segments 14. The pair of substrates 32 suitably define a liquid crystal cell having a cell gap $d_{seg}$ equal to the thickness $d_{seg}$ of the segmented GRIN lens 10. Electrodes 34 and 36 are arranged to electrically bias the central disk 12 and the plurality of annular segments 14 to provide a variable power GRIN lens whose focus is electrically tunable using the electrodes 34 and 36. The illustrative electrodes 34 and 36 include a segmented electrode 34 that enables different electrical biases to be applied to different segments 14 and to the central disk 12, while the electrode 36 is a continuous ground electrode. The refractive optical device 30 of FIG. 4 part (A) is merely a nonlimiting illustrative example. See Liwei Li, Doug Bryant, and Philip J. Bos, "Liquid crystal lens with concentric electrodes and inter-electrode resistors", *Liquid Crystal Reviews* vol. 2 no. 2, pages 130-154 (2014) (hereinafter "Li et al.") which is incorporated herein by reference in its entirety for other suitable embodiments employing liquid crystal material for the GRIN lens and electrode arrangements for biasing same.

FIG. 4 part (B) diagrammatically illustrates an augmented reality (AR) or virtual reality (VR) headset 40 in which two instances of the illustrative refractive optical device 30 of part (A) suitably serve as left-eye and right-eye eyepieces of the AR or VR headset 40. The illustrative refractive optical device 30 suitably implements eyepieces with variable focus over a (for example) 2 Diopter range to provide for accommodation as the eye focuses on AR or VR content at various different distances from the eyes. FIG. 4 does not illustrate other known components typically included in such a headset, such as an optical projection system for generating the AR or VR content.

With reference to FIG. 1 parts (A) and (B) and FIG. 4 part (A), In another contemplated aspect, which can be used independently of or together with the disclosed hybrid optical phase, the segmented GRIN lens 1 or 10 can have reduced image degradation due to diffraction and light scattering by including light blocking material 50 disposed over the interfaces between adjacent annular segments 14, $14_C$, $14_P$ and over the interface between the central disk 10 and the innermost annular segment 14 or $14_{C1}$. The light blocking material operates to minimize image degradation due to light scattered at these interfaces. The light blocking material 50 can be any material that is capable of blocking light at the design wavelength $\lambda$. For example, the light blocking material 50 can in some embodiments be chrome oxide. As the interfaces are annular rings, the light blocking material 50 covering each interface is suitably an annular ring of the light blocking material 50. In some embodiments, to ensure adequate blockage of light from the interfaces, the light blocking material disposed over each interface has a radial width of at least 1.5 times a thickness of the disk of the segmented GRIN lens 1 or 10. In FIG. 4 part (A), the light blocking material 50 is disposed on the gaps between the segmented electrodes 34; however, the light blocking material could be disposed on the continuous electrode 36 or on both.

Segmented GRIN lenses having the structures of respective parts (A) and (B) of FIG. 1 have been constructed and numerically modeled. One device had a parabolic optical phase profile and corresponded to the GRIN lens 1 of FIG. 1 part (A) and FIG. 2 part (A), and the other had the hybrid optical phase profile of FIG. 1 part (B) and FIG. 2 part (B). Details of the constructed segmented GRIN lenses are as follows: Diameter: 5 cm; LC material: Merck Liquid Crystal MLC 2172 ($\Delta n$=0.2939; ne=1.8139, no=1.5225; dielectric anisotropy, $\Delta\varepsilon$ (at 1 kHz)=13.4; $\varepsilon_{parallel}$=17.8, $\varepsilon_{perpendicular}$=4.4; rotational viscosity, Y=334 mPas). Each lens included a stack of two 20 micron cells, and both had the same basic structure as report by Li et al., but in this case the number of driven electrodes was 1365, with an approximate equal number of floating electrodes as defined in Li et al. Also, the segmented GRIN lenses had the light blocking layer 50 over the interfaces between adjacent annular segments and over the interface between the central disk and the innermost segment. Considering the lens to be placed 1.5 cm in front of a user's eye, for the lens with the parabolic phase profile (FIG. 1 part (A)), a gaze angle of about 15 degrees corresponded to a lens radius value of 5 mm, and a phase segment width of 2 mm. A gaze angle of about 27 degrees corresponded to radius of 10 mm and a segment width of 1.1 mm. A gaze angle of about 35 degrees corresponded to a lens radius of 15 mm and a phase segment width of 0.75 mm. A gaze angle of about 45 degrees corresponded to a lens radius of 20 mm and a segment width of 0.5 mm. The parabolic phase region of each lens corresponded to a maximum magnitude of optical power of 0.8 diopters. The hybrid phase profile lens (FIG. 1 part (B)) was the same as the parabolic profile except that at a gaze angle greater than 30 degrees, the phase segment width W was fixed at 1 mm. The calculated phase profile in the region of the lens corresponding to about 45 degree gaze angle for the parabolic and hybrid phase files is shown in FIG. 2 parts (A) and (B), respectively.

Figure 5:
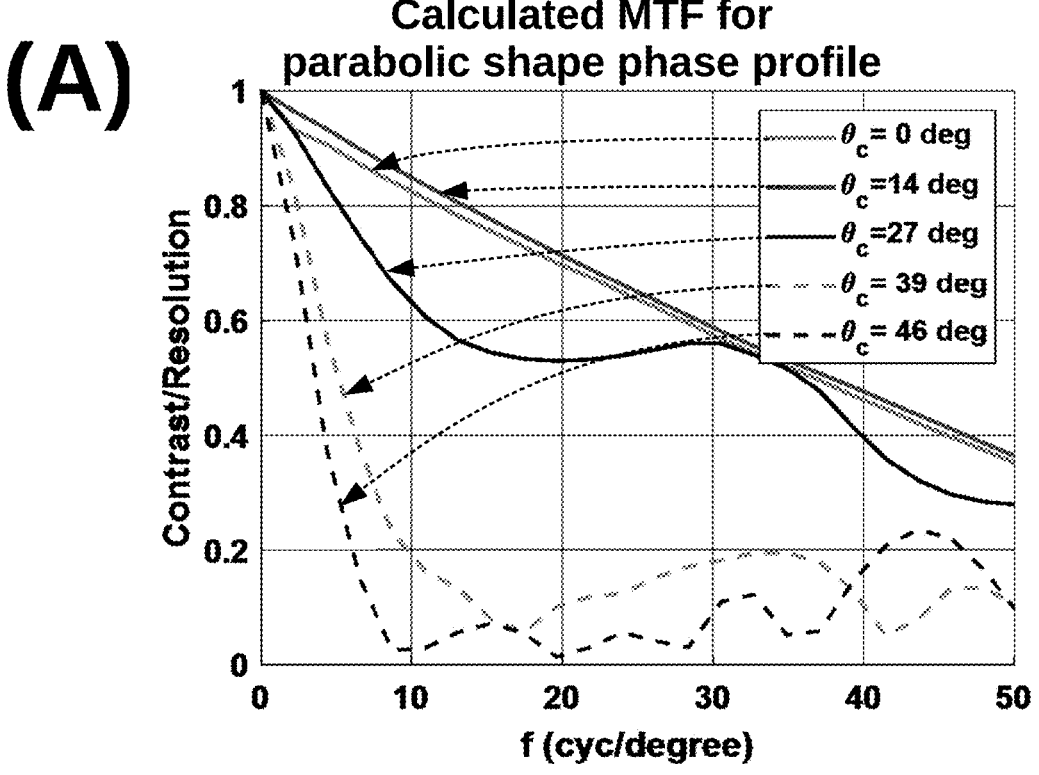
FIG. 5 diagrammatically shows: (A) a calculated modulated transfer function (MTF) for the GRIN lens of FIG. 1 part (A); and (B) a calculated MTF for the GRIN lens of FIG. 1 part (B).
Figure 5:
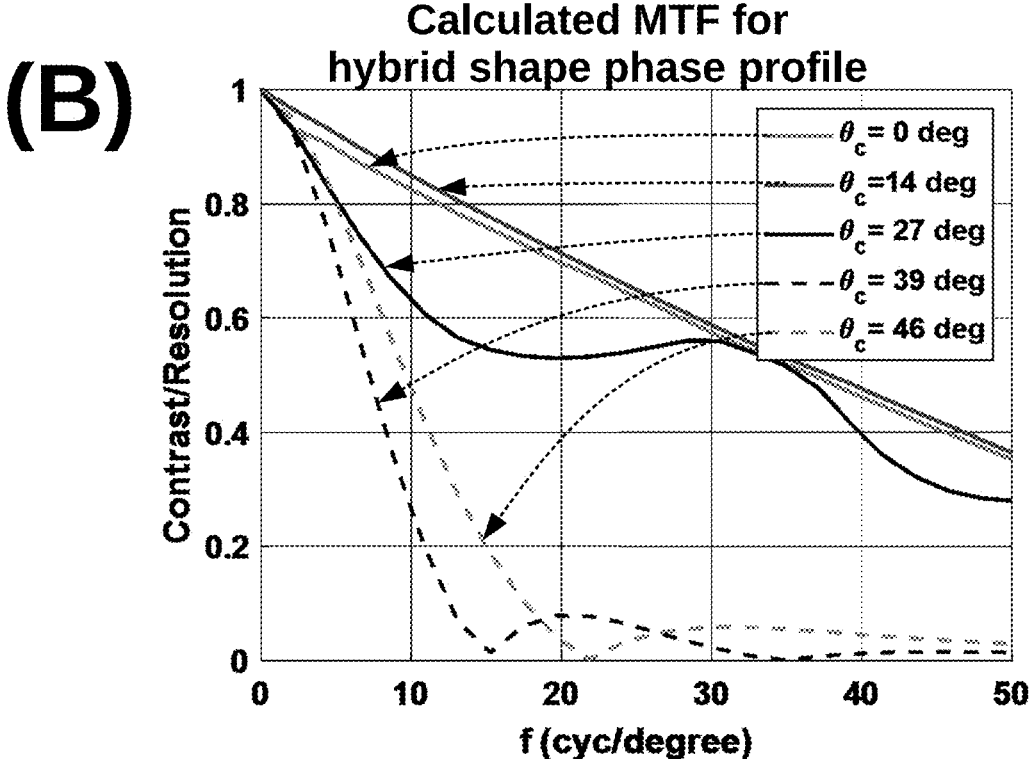

With reference to FIG. 5 parts (A) and (B), the modulated transfer function (MTF) was numerically calculated for these two lenses, considering that the pupil size of the user's eye is approximately 3 mm. As seen in FIG. 5 parts (A) and (B), for gaze angles of about 35 and 45 degrees the hybrid optical phase profile lens (FIG. 1 part (B)) has the best MTF value. It is also seen that for the calculated gaze angles of less than 30 degrees, the two lenses have comparable performance.

As an experimental test, a subjective user evaluation of the performance of the two constructed segmented GRIN lenses was also done. It was found that all users (about 30 in total) preferred the imaging quality of the segmented GRIN lens with the hybrid optical phase profile (FIG. 1 part (B)) over the segmented GRIN lens with the purely parabolic optical phase profile (FIG. 1 part (A)).

Without being limited to any particular theory of operation, the improvement of the hybrid segmented phase profile design of FIG. 1 part (B) compared to entirely parabolic shape phase profile of FIG. 1 part (A) is believed to be due to at least two factors. One factor is that that the minimum phase segment width of 1 mm or larger (in the experiments) keeps the diffracted angle smaller than easily observed. Another factor is that the lowered phase reset density (corresponding to the number of annular segments) lowers the amount of diffracted light. The addition of the light blocking layer 50 over the phase boundaries further reduces the effect of scattered light.

It will be appreciated that various of the above-disclosed and other features and functions, or alternatives thereof, may be desirably combined into many other different systems or applications. It will be further appreciated that various presently unforeseen or unanticipated alternatives, modifications, variations or improvements therein may be subsequently made by those skilled in the art which are also intended to be encompassed by the following claims.

The invention claimed is:

1. A refractive optical device comprising:
a gradient refractive index (GRIN) lens shaped as a disk and including a central disk and a plurality of annular segments including:
    a plurality of central annular segments disposed around the central disk, and
    a plurality of peripheral annular segments disposed around the plurality of central annular segments;
wherein:
    the central disk and each annular segment is transparent at a design wavelength;
    the central disk and each annular segment has a continuous optical phase profile at the design wavelength along a radial direction extending radially outward from a center of the central disk;
    an optical phase discontinuity is present at the interface between the central disk and the innermost central annular segment and at the interface between each pair of adjacent annular segments;
    radial widths of the central annular segments decrease with increasing distance away from the center of the central disk; and
    the peripheral annular segments have optical phase profiles for the design wavelength with magnitudes of maximum first derivatives that are constant or become smaller with increasing distance of the peripheral annular segments away from the center of the central disk.

2. The refractive optical device of claim 1 wherein each peripheral annular segment has a linear optical phase profile at the design wavelength.

3. The refractive optical device of claim 1 wherein the central disk and each central annular segment has a parabolic optical phase profile at the design wavelength.

4. The refractive optical device of claim 1 wherein the peripheral annular segments each have a fixed width W.

5. The refractive optical device of claim 4 wherein the fixed width W of the peripheral annular segments is 0.8 mm or larger.

6. The refractive optical device of claim 1 wherein the peripheral annular segments have optical phase profiles for the design wavelength with constant first derivatives.

7. The refractive optical device of claim 1 further comprising:

light blocking material disposed over the interface between the central disk and the central annular segment adjacent the central disk and over the interface between each pair of adjacent annular segments, the light absorbing material effective to block light at the design wavelength.

8. The refractive optical device of claim 7 wherein the GRIN lens is shaped as said disk having a thickness and the light blocking material disposed over each interface has a radial width of at least 1.5 times the thickness of the disk.

9. The refractive optical device of claim 1 wherein the central disk and each annular segment of the GRIN lens comprises a liquid crystal material, the refractive optical device further comprising:

a pair of substrates confining the central disk and the plurality of annular segments; and electrodes arranged to electrically bias the central disk and the plurality of annular segments;

wherein the GRIN lens and the electrodes form a variable power GRIN lens whose focus is electrically tunable using the electrodes.

10. An augmented reality (AR) or virtual reality (VR) system including:

An AR or VR headset; and a variable power left eye lens and a variable power right eye lens each comprising a refractive optical device as set forth in claim 9, wherein the variable power left and right eye lenses are configured to provide accommodation for viewing of AR or VR content at different distances.

11. A refractive optical device comprising:

a gradient refractive index (GRIN) lens shaped as a disk having a radius of at least 2.5 cm and including a central disk and a plurality of annular segments including:

a plurality of central annular segments disposed around the central disk, and a plurality of peripheral annular segments disposed around the plurality of central annular segments;

wherein:

the central disk and each annular segment is transparent at a design wavelength;

the central disk and each annular segment has a continuous optical phase profile at the design wavelength along a radial direction extending radially outward from a center of the central disk;

an optical phase discontinuity is present at the interface between the central disk and the innermost central annular segment and at the interface between each pair of adjacent annular segments;

radial widths of the central annular segments decrease with increasing distance away from the center of the central disk; and the peripheral annular segments have widths of at least 0.8 mm.

12. The refractive optical device of claim 11 wherein each peripheral annular segment has a linear optical phase profile at the design wavelength.

13. The refractive optical device of claim 11 wherein the central disk and each central annular segment has a parabolic optical phase profile at the design wavelength.

14. The refractive optical device of claim 11 further comprising:

light blocking material disposed over the interface between the central disk and the innermost central annular segment and over the interface between each pair of adjacent annular segments, the light absorbing material effective to block light at the design wavelength.

15. The refractive optical device of claim 14 wherein the GRIN lens is shaped as said disk having a thickness and the light blocking material disposed over each interface has a radial width of at least 1.5 times the thickness of the disk.

16. The refractive optical device of claim 11 wherein the central disk and each annular segment of the GRIN lens comprises a liquid crystal material, the refractive optical device further comprising:

a pair of substrates confining the central disk and the plurality of annular segments; and electrodes arranged to electrically bias the central disk and the plurality of annular segments;

wherein the GRIN lens and the electrodes form a variable power GRIN lens whose focus is electrically tunable using the electrodes.

17. An augmented reality (AR) or virtual reality (VR) system including:

An AR or VR headset; and a variable power left eye lens and a variable power right eye lens each comprising a refractive optical device as set forth in claim 16, wherein the variable power left and right eye lenses are configured to provide accommodation for viewing of AR or VR content at different distances.

18. The refractive optical device of claim 11 wherein the peripheral annular segments each have a fixed width W of at least 0.8 mm.

19. A refractive optical device comprising:

a gradient refractive index (GRIN) lens shaped as a disk and including a central disk and a plurality of annular segments disposed around the central disk; and light blocking material disposed over the interface between the central disk and the innermost central annular segment and over the interface between each pair of adjacent annular segments, the light absorbing material effective to block light at a design wavelength;

wherein:

the central disk and each annular segment is transparent at the design wavelength;

the central disk and each annular segment has a continuous optical phase profile at the design wavelength along a radial direction extending radially outward from a center of the central disk;

an optical phase discontinuity is present at the interface between the central disk and the innermost central annular segment and at the interface between each pair of adjacent annular segments;

the plurality of annular segments disposed around the central disk include a plurality of central annular segments disposed around the central disk and a plurality of peripheral annular segments disposed around the plurality of central annular segments;

radial widths of the central annular segments decrease with increasing distance away from the center of the central disk; and the peripheral annular segments each have a fixed width W.

20. The refractive optical device of claim 19 wherein the GRIN lens is shaped as said disk having a thickness and the light blocking material disposed over each interface has a radial width of at least 1.5 times the thickness of the disk.

21. The refractive optical device of claim 19 wherein the light blocking material comprises chrome oxide.

\* \* \* \* \*